(12) United States Patent
Siu et al.

(10) Patent No.: US 9,161,400 B2
(45) Date of Patent: Oct. 13, 2015

(54) METHOD AND APPARATUS FOR CANCELLING OUTPUT CURRENT RIPPLES IN LED DRIVING CIRCUITS

(71) Applicant: Huizhou Light Engine Limited, Huizhou (CN)

(72) Inventors: Kam Wah Siu, Hong Kong (CN); Wa Hing Leung, Hong Kong (CN); Siu Hong Wong, Hong Kong (CN); Bo Tian, Hong Kong (CN)

(73) Assignee: Huizhou Light Engine Limited, Huizhou (CN)

( * ) Notice: Subject to any disclaimer, the term of this patent is extended or adjusted under 35 U.S.C. 154(b) by 107 days.

(21) Appl. No.: 14/037,909

(22) Filed: Sep. 26, 2013

(65) Prior Publication Data

US 2015/0084527 A1      Mar. 26, 2015

(51) Int. Cl.
*H05B 33/08* (2006.01)
*H05B 37/02* (2006.01)

(52) U.S. Cl.
CPC .................................. *H05B 33/0815* (2013.01)

(58) Field of Classification Search
None
See application file for complete search history.

(56) References Cited

U.S. PATENT DOCUMENTS

| 4,277,728 | A  | * | 7/1981 | Stevens ........................ 315/307 |
| 6,272,027 | B1 |   | 8/2001 | Fraidlin et al. |
| 7,658,510 | B2 | * | 2/2010 | Russell .................... 362/249.02 |
| 2014/0016381 | A1 | * | 1/2014 | Sun ................................. 363/89 |
| 2014/0084798 | A1 | * | 3/2014 | Wang et al. ............... 315/200 R |

FOREIGN PATENT DOCUMENTS

| CN | 103108433 A | 5/2013 |
| CN | 203645863 U | 6/2014 |

OTHER PUBLICATIONS

Office Action dated Oct. 11, 2014 for Chinese Patent Application No. 201310504074.4 (with English translation).
May 28, 2014 Office Action for Chinese Patent Application No. 201310504074.4 (with English translation).

\* cited by examiner

*Primary Examiner* — Douglas W Owens
*Assistant Examiner* — Dedei K Hammond
(74) *Attorney, Agent, or Firm* — Schiff Hardin LLP

(57) ABSTRACT

A device and method for reducing current ripple to a light emitting diode array having a single stage power factor correction driver with an output voltage ripple that is reduced by using a linear current regulator connected in series between the single stage power factor correction driver and the light emitting diode array, which actively adjusts an equivalent impedance of the linear current regulator in correspondence with the output voltage ripple of the single stage power factor correction driver.

14 Claims, 10 Drawing Sheets

METHOD AND APPARATUS FOR CANCELLING OUTPUT CURRENT RIPPLES IN LED DRIVING CIRCUITS

TECHNICAL FIELD OF THE INVENTION

The present invention relates to a device and method for reducing the output power ripple of a single-stage power factor correction driver being driven by AC mains voltage, principally for use in supplying a light emitting diode array without flicker.

BACKGROUND OF THE INVENTION

A light emitting diode ("LED") is an illuminating device that converts electrical current into light. The luminosity of an LED is mainly determined by the magnitude of the driving current. Hence, to obtain a stable luminous output without flicker, LEDs should be driven by a constant-current source.

General lighting products are usually powered by an AC mains voltage of 110 or 220 VAC at 50 or 60 Hz line frequency. Single-stage power factor correction ("SSPFC") drivers are commonly used to convert AC line voltage into DC voltage for driving these LEDs. This is because an SSPFC driver is a simple circuit that achieves both voltage conversion and power factor correction. However, the input power to the SSPFC varies in correspondence to the AC mains voltage due to power factor correction. The input power ripple induces an output voltage ripple and output current ripple. Consequently, using an SSPFC driver to power LEDs directly leads to light flickering at twice the line frequency. Increasing the output capacitance of the SSPFC driver is a direct approach to reduce the output power ripple. However, the value of output capacitors is limited by factors such as size, cost and lifetime. Other solutions exist, but such solutions lead to a reduction in efficiency, increase in cost and more complex designs.

BRIEF SUMMARY OF THE INVENTION

One embodiment of the invention is a lighting array comprising a single stage power factor correction driver that converts an AC supply voltage to DC and provides a power correction factor; a light emitting diode array; and a linear current regulator connected in series between the single stage power factor correction driver and the light emitting diode array to actively adjust an equivalent impedance of the linear current regulator in correspondence with the output voltage ripple of the single stage power factor correction driver.

Another embodiment of the invention is where the lighting array has a valley voltage detector coupled between the linear current regulator and the single stage power factor correction driver to feed the valley value of the voltage drop across the linear current regulator back to the single stage power factor correction driver to modulate the DC output voltage value of the single stage power factor correction driver. The linear current regulator may be a switching mode current regulator or an active linear current regulator, and the light emitting diode may be a high voltage array.

In another embodiment of the invention, the linear current regulator comprises semiconductor switching device and a constant voltage controller.

In another embodiment of the invention, the single stage power factor correction driver is in a Buck topology.

In another embodiment, the frequency of the output voltage ripple is approximately twice the input line frequency.

Another embodiment of the invention is a method of reducing output current ripple to a light emitting diode comprising converting an AC supply voltage to DC and providing a power correction factor through a single stage power factor correction driver, with an output of the single stage power factor correction driver having an output voltage ripple; and adjusting an equivalent impedance of the linear current regulator in correspondence with the output voltage ripple of the single stage power factor correction driver through a linear current regulator connected in series between the single stage power factor correction driver and a light emitting diode array.

In another embodiment of the invention, further comprising feeding the valley value of the voltage drop across the linear current regulator back to the single stage power factor correction driver to modulate a direct current output value of the single stage power factor correction driver.

BRIEF DESCRIPTION OF THE DRAWINGS

The figures are for illustration purposes only and are not necessarily drawn to scale. The invention itself, however, may best be understood by reference to the detailed description which follows when taking in conjunction with the accompanying drawings in which.

DETAILED DESCRIPTION OF THE INVENTION

Figure 1:
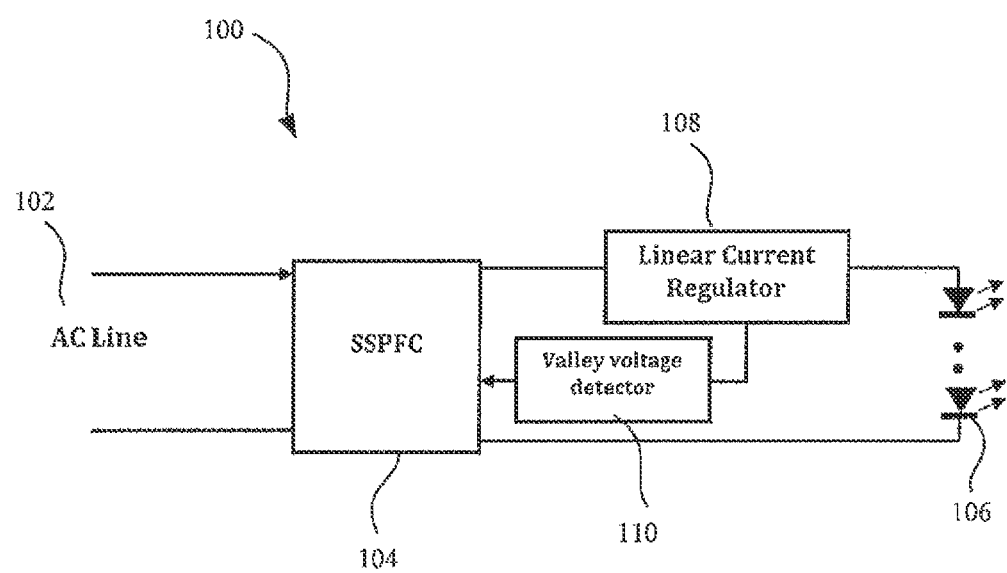
FIG. 1 shows a general diagram of one embodiment of the present invention.

As shown in FIG. 1, flicker-less LED driver 100 consists of SSPFC 104, LED array 106, linear current regulator 108 and valley voltage detector 110. SSPFC 104 converts the voltage from AC line 102 to a DC voltage and also provides the power factor correction. At the output of SSPFC 104, linear current regulator 108 is connected, in series with LED array 106. Linear current regulator 108 actively adjusts its equivalent impedance in correspondence to the output voltage ripple of SSPFC 104. The voltage drop across linear current regulator 108 changes in accordance with the output voltage ripple of SSPFC 104, resulting in the removal of the voltage ripple in the inputs to LED array 106.

To ensure that linear current regulator 108 has sufficient voltage drop for regulation and operates with minimum power loss, the valley value of the voltage drop on linear current regulator 108 is fed back to SSPFC 104 through valley voltage detector 110 so that SSPFC 104 can adjust its output voltage level. This feedback loop allows regulation of the voltage drop of linear current regulator 108. This control scheme enables linear current regulator 108 to operate at minimum power consumption in achieving current regulation.

Figure 2:
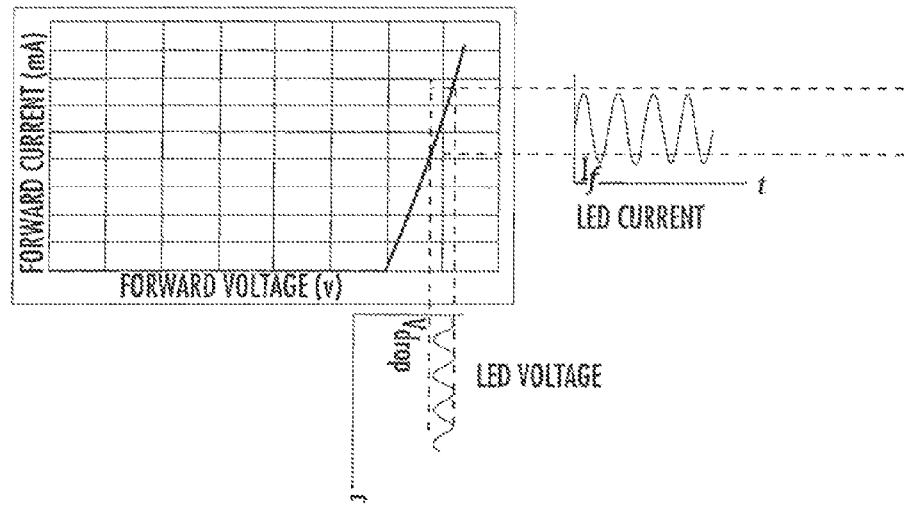
FIG. 2 shows the V-I characteristics of an LED array.

More specifically, it is assumed that the output voltage of the SSPFC has a ripple at approximately twice the line-frequency due to a sufficiently large output capacitance of the SSPFC and that the LED array always conducts when the SSPFC operates. In such a circumstance, when an SSPFC is driving an LED array, its output voltage is determined by the LED array because LEDs have a non-linear characteristic, as shown in FIG. 2. Hence, when the LED array conducts it clamps the output voltage of the SSPFC. Since the output voltage of the SSPFC carries voltage ripple, the SSPFC may be modeled as a DC voltage source in series with an AC voltage source, as shown FIG. 3. $V_{out\_dc}$ represents the average output voltage and $V_{out\_ac}$ represents the output voltage ripple.

Figure 3:
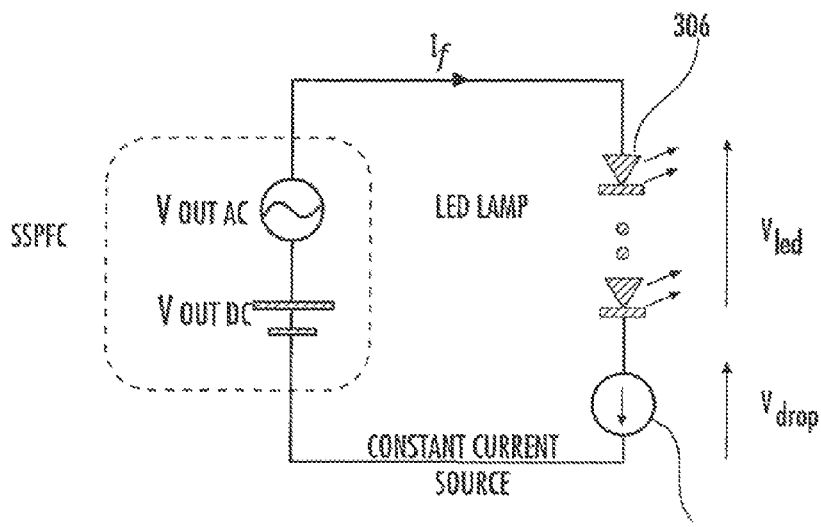
FIG. 3 depicts the voltage source as having both an AC and DC component and adds a current source.
Figure 4A:
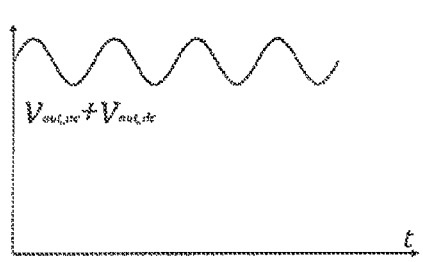
FIGS. 4A through 4D show waveforms of the voltage source, voltage across the current source, LED array forward voltage and LED current of the present invention.
Figure 4B:
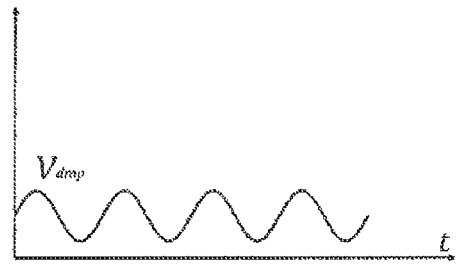
Figure 4C:
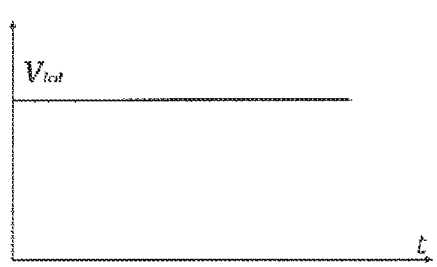
Figure 4D:
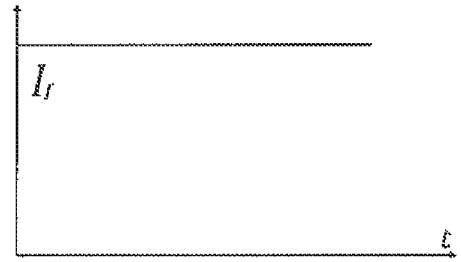

To avoid the voltage ripple being applied to the LED array, a constant current source, for example linear current regulator 308, is added in series with LED array 306, shown in FIG. 3. Linear current regulator 308 actively adjusts its equivalent impedance to make the LED current constant, consequently the voltage across the linear current regulator 308 changes in correspondence to the output voltage ripple. As a result, the voltage across LED array 306 is constant. The resulting waveforms of the voltage source, voltage across the current source, LED array forward voltage and LED current are shown in FIGS. 4A through 4D, respectively. FIGS. 4A and 4B show that the essence of the proposed driving method is to utilize the current source to take up the ripple of the voltage source, $V_{out\_ac}$, so that the forward voltage of the LEDs is constant. In practice the current source can be implemented by either a switching mode current regulator or an active linear current regulator.

Output Voltage Ripple

Figure 5:
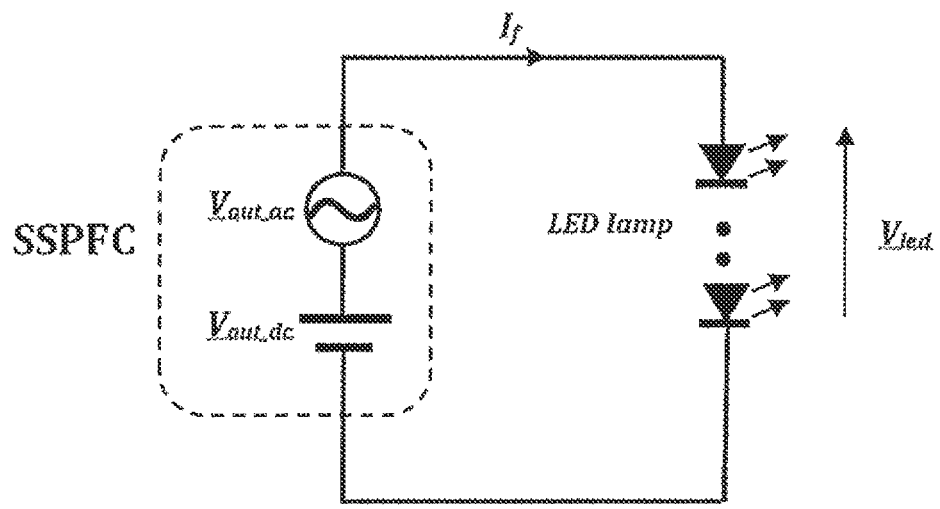
FIG. 5 is an equivalent circuit of FIG. 3 without the current source.

The output voltage ripple varies depending on the number of serial LEDs, LED forward voltage and average LED driving current. A mathematical expression of the output voltage ripple may be determined based on the afore-mentioned variables. In the discussion of formulating the output voltage ripple, the current source shown in FIG. 3 is ignored for the simplicity of analysis and the equivalent circuit is shown in FIG. 5. The power dissipation on the current regulator is small in comparison to the LED power when the LED forward voltage is much higher than the voltage drop on the current regulator. Thus ignoring the voltage drop on the current regulator is permissible. This is permissible because adding the constant current source does not affect the output voltage ripple of the SSPFC much because the average output power is almost unchanged.

The relationship between the magnitude of voltage ripple and the magnitude of current ripple is demonstrated by the V-I curve shown in FIG. 2. For the simplicity of analysis, the V-I characteristic of an LED is approximated by a $3^{rd}$ order polynomial, which is valid when the LED is driven in its operating region:

$$V_f = aI_f^3 + bI_f^2 + cI_f + d \quad \text{(Eq. 1)}$$

For an LED array containing n pieces of LEDs in serial and being driven by a current of average value $I_{f\_avg}$, the average voltage of the LED array is given as:

$$V_{led\_avg} = nV_{f\_avg} = anI_{f\_avg}^3 + bnI_{f\_avg}^2 + cnI_{f\_avg} + dn \quad \text{(Eq. 2)}$$

As the current of the LED array carries ripple, let $I_{ripple}$ denote the magnitude of the current ripple while $I_{f\_max}$ and $I_{f\_min}$ denote the peak and valley value of the current, then:

$$I_{ripple} = I_{f\_max} - I_{f\_min} \quad \text{(Eq. 3)}$$

$$I_{f\_avg} = \frac{I_{f\_max} + I_{f\_min}}{2} \quad \text{(Eq. 4)}$$

Let k be the ratio of the magnitude of current ripple to the average current:

$$k = \frac{I_{ripple}}{I_{f\_avg}} \quad \text{(Eq. 5)}$$

Let $V_{ripple}$ be the magnitude of the voltage ripple (peak to peak) of the LED array, then:

$$\begin{aligned} V_{ripple} &= V_{led\_max} - V_{led\_min} \\ &= an(I_{f\_max}^3 - I_{f\_min}^3) + bn(I_{f\_max}^2 - I_{f\_min}^2) + \\ &\quad cn(I_{f\_max} - I_{f\_min}) \end{aligned} \quad \text{(Eq. 6)}$$

Substituting Eq. 3, Eq. 4 and Eq. 5 into Eq. 6, Eq. 6 is further simplified as:

$$V_{ripple} = nkI_{f\_avg}\left[aI_{f\_avg}^2\left(3 + \frac{k^2}{4}\right) + 2bI_{f\_avg} + c\right] \quad \text{(Eq. 7)}$$

According to Eq. 7, the magnitude of voltage ripple is determined by three parameters, a, b, and c, and 3 variables: n, k and $I_{f\_avg}$. By choosing a particular model of LED, a, b, and c can be defined. From this the dependence of voltage ripple on n, k and $I_{f\_avg}$ can be found.

Efficiency of the Linear Current Regulator

An active linear current regulator may be used to implement the linear current regulator. An inherent drawback of a linear current regulator is that it consumes more power than a switching-mode regulator. In determining the power loss, let $P_{drop\_avg}$ be the average power dissipation by the linear current regulator:

$$P_{drop\_avg} = V_{drop\_avg} \times I_{f\_avg}$$

If $V_{drop\_avg}$ is reduced, then the power loss from the linear current regulator is reduced. Practically, there is a threshold voltage drop for the linear current regulator to regulate the LED current. The valley voltage refers to the Lowest level of $V_{drop}$. If the valley voltage of the linear current regulator equals the threshold value, then the power loss is minimized.

Figure 6:
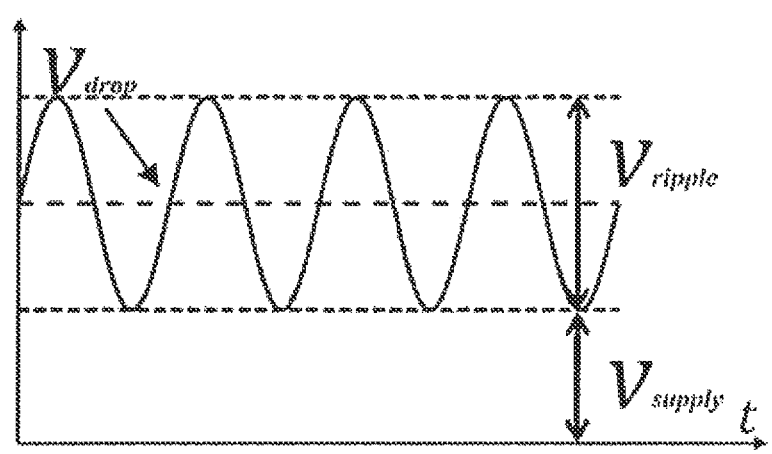
FIG. 6 is a graph of the optimized voltage dropout of the linear regulator.
Figure 7:
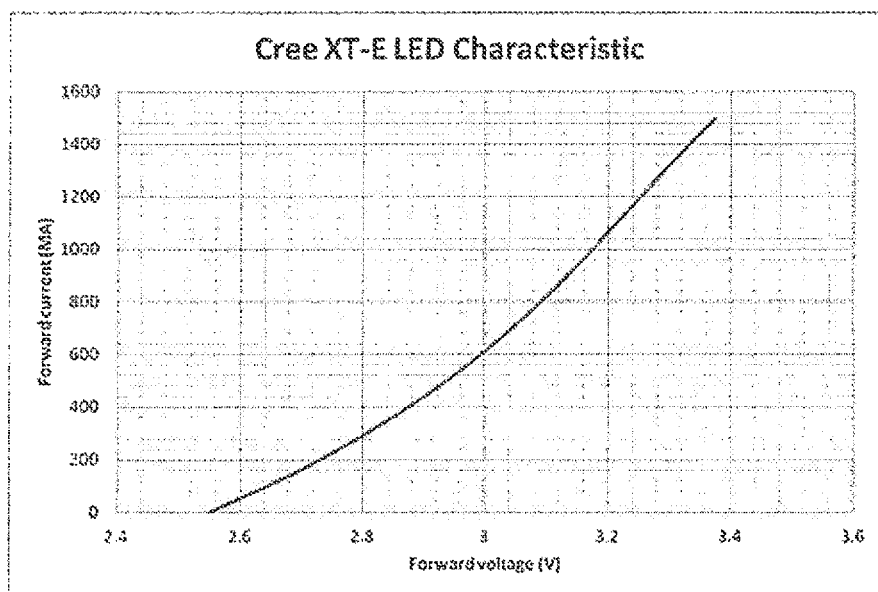
FIG. 7 shows the V-I characteristic of an exemplary LED.

The optimized voltage dropout of the linear regulator is shown in FIG. 6, where $V_{supply}$ is the threshold value. In FIG. 6, the valley value of $V_{drop}$ is equal to $V_{supply}$. The AC component of $V_{drop}$, which is the output voltage ripple of the SSPFC, is assumed to be sinusoidal. Therefore, the average value of the voltage dropout in FIG. 6 is:

$$V_{drop\_avg} = V_{supply} + \frac{1}{2} V_{ripple} \quad (Eq.\ 8)$$

Where η represents the efficiency of the linear current regulator (the ratio of the LED array's power to the total output power of the SSPFC), η is governed by the following expression:

$$\eta = \frac{P_{LED}}{P_{drop} + P_{LED}}$$

Thus, in the optimized situation:

$$\eta = \frac{V_{led\_avg} \times I_f}{(V_{drop\_avg} + V_{led\_avg}) \times I_f} \quad (Eq.\ 9)$$

$$= \frac{1}{\frac{V_{drop\_avg}}{V_{led\_avg}} + 1}$$

$$= \frac{1}{\frac{V_{supply}}{V_{led\_avg}} + \frac{1}{2}\frac{V_{ripple}}{V_{leg\_avg}} + 1}$$

Recall Eq. 2 and Eq. 7, $V_{led\_avg}$ is expressed as a function of n and $I_{f\_avg}$. $V_{ripple}$ is expressed as a function of n, k and $I_{f\_avg}$. $V_{supply}$ can be regarded as a fixed parameter defined by the linear current regulator's intrinsic characteristic. Therefore, η can be re-written as a function of three variables, n, k and $I_{f\_avg}$:

$$\eta = f(n, k, I_{f\_avg}) \quad (Eq.\ 10)$$

while the function $f$ is defined by the parameters a, b, c, d and $V_{supply}$.

To find the dependence of η on n, k, and $I_{f\_avg}$, an LED model must be chosen to define a, b, c and d. For illustration purpose, the Cree XT-E LED, CLD-DS41 REV 8A, is used.

From Eq. 1, the V-I characteristic of an LED can be approximated by a $3^{rd}$ order polynomial. Using multiple linear regression, the parameters a, b, c, d are found according to the actual V-I characteristic of Cree XT-E:

$$V_f = 1.5 \times 10^{-4} I_f^3 - 0.523 I_f^2 + I_f + 2.55 \quad (Eq.\ 11)$$

With a, b, c, d defined, Eq. 7 and Eq. 2 can be written as:

$$V_{ripple} = nkI_{f\_avg}\left[1.5 \times 10^{-4} I_{f\_avg}^2 \left(3 + \frac{k^2}{4}\right) + 2 \times 0.523 I_{f\_avg} + 1\right] \quad (Eq.\ 12)$$

$$V_{led\_avg} = 1.5 \times 10^{-4} n I_{f\_avg}^3 - 0.523 n I_{f\_avg}^2 + n I_{f\_avg} + 2.55n \quad (Eq.\ 13)$$

Assume $V_{supply} = 3V$ and then substitute Eq. 1 and Eq. 13 into Eq. 9. The restating curves of the efficiency of the linear current regulator are shown in FIGS. 8A and 8B.

Figure 8A:
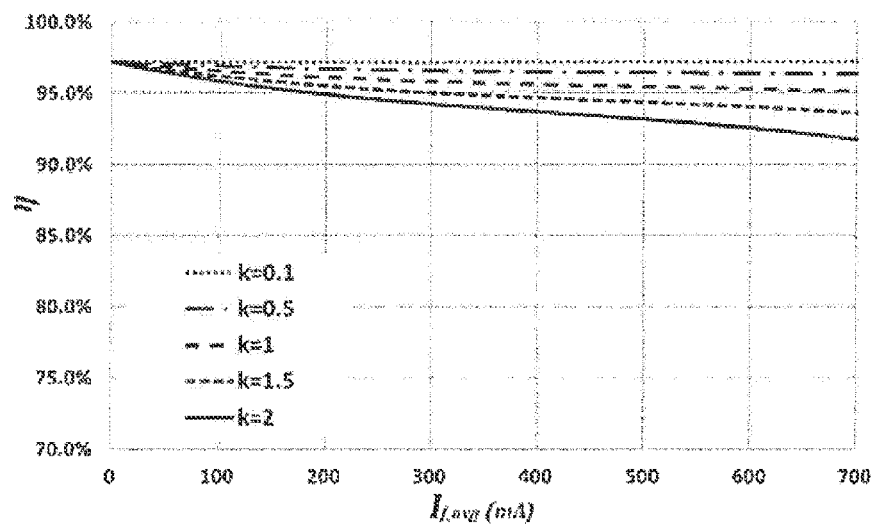
FIGS. 8A and 8B show the efficiency of the circuits at different values of k.
Figure 8B:
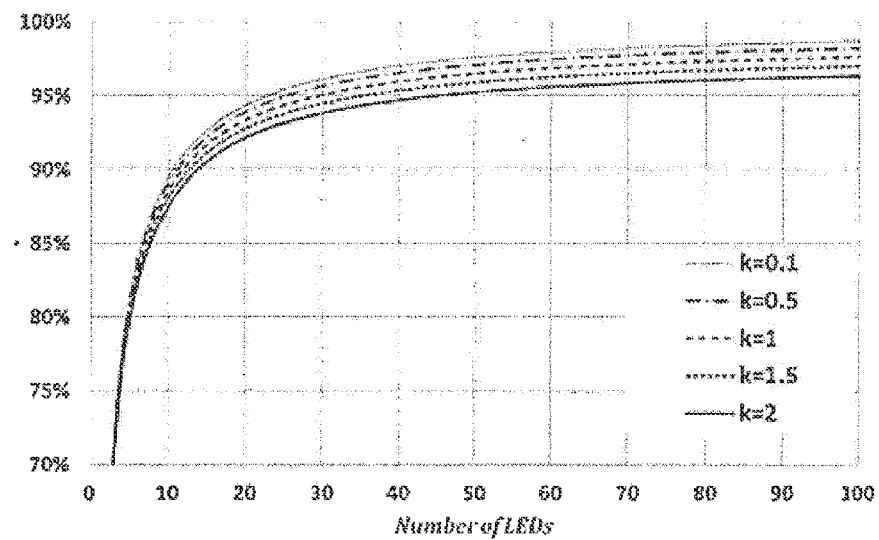

The value of n, k, and $I_{f\_avg}$ shown in FIGS. 8A and 8B are defined based on typical operating conditions of LEDs. In FIG. 8A, different k value plots are shown where n=40. In FIG. 8B, different k value plots are shown where $I_{f\_avg}$=200 mA. For example, the maximum value of k, the ratio of current ripple to average current, does not exceed 2, otherwise the LED current will be discontinuous. FIG. 8A shows that η decreases when $I_{f\_avg}$ increases. Compared to FIG. 8B, the decrease of η is not significant: it is within 5% when if $I_{f\_avg}$ increases from 0 to 700 mA. It can be concluded that efficiency has little dependence on the average LED current.

FIG. 8B shows that n increases significantly when as increases. η increases more than 25% when n increases from 0 to 40. This indicates that efficiency has strong dependence on the number of LEDs, which implies that it is dependent on the forward voltage of the LED array. Therefore, the proposed driving method is suitable to be applied to high-voltage LED arrays to achieve high efficiency.

Both FIGS. 8A and 8B show that η decreases when k increases. But the decrease of is smaller than 10% when k increases from 0.1 to 2. This shows the weak dependence of efficiency on LED current ripple.

Valley Voltage Regulation

Since the LED's V-I characteristic drifts along with the change in temperature, which eventually changes $V_{ripple}$, the current regulator may not be able to deliver constant current due to insufficient voltage drop if $P_{drop\_avg}$ is fixed at certain level. This is because the offset of the voltage drop on the linear current regulator is independent of $V_{ripple}$ (see Eq. 14).

$$V_{drop\_avg} = V_{out\_dc} - V_{led\_avg} \quad (Eq.\ 14)$$

Figure 9:
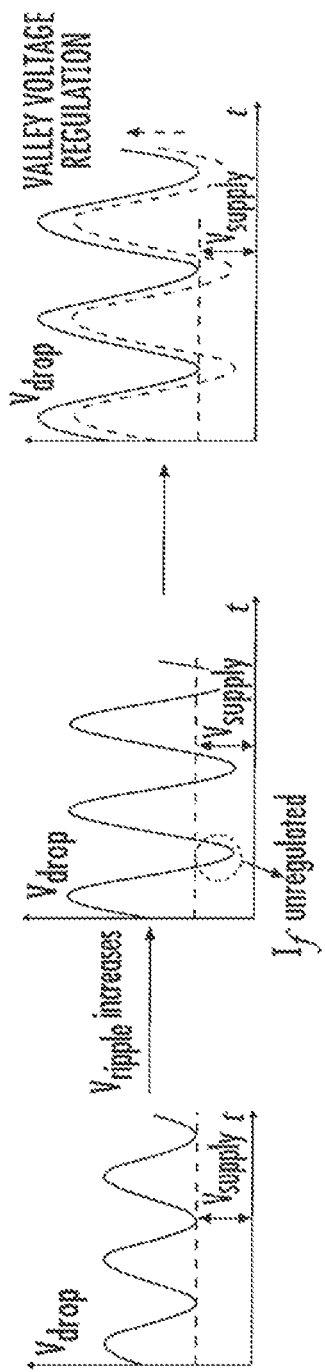
FIGS. 9 and 10 are graphs showing how the voltage across the linear current regulator needs to be actively adjusted to counteract changes in the voltage ripple to ensure an adequate voltage drop for the linear regulator to perform current regulation.
Figure 10:
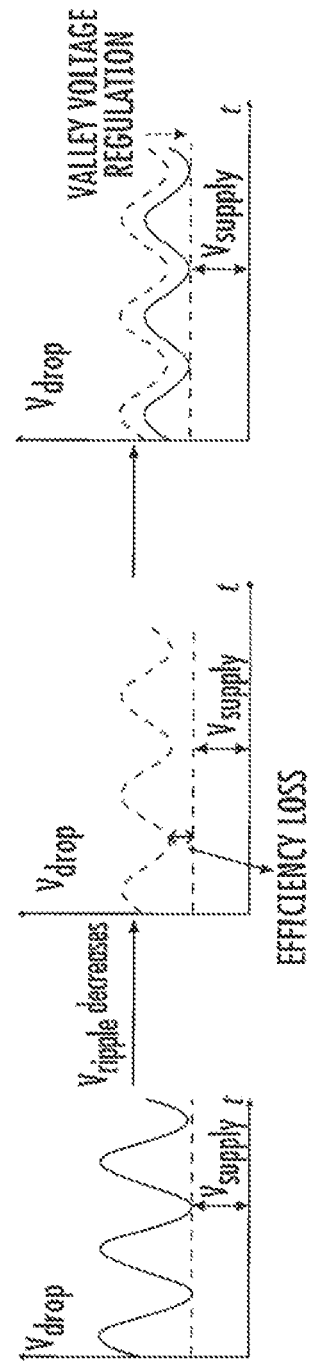

To ensure an adequate voltage drop for the linear regulator to perform current regulation, $V_{drop\_avg}$ needs to be actively adjusted to counteract the $V_{ripple}$ changes, shown in FIGS. 9 and 10. This can be achieved by implementing a voltage control loop to regulate the valley voltage of $V_{drop}$. The valley voltage regulation utilizes a valley voltage detector to feedback the valley value of $V_{drop}$ to the SSPFC to modulate $V_{out\_dc}$, which eventually adjusts $V_{drop\_avg}$.

Experimental Results

Figure 11:
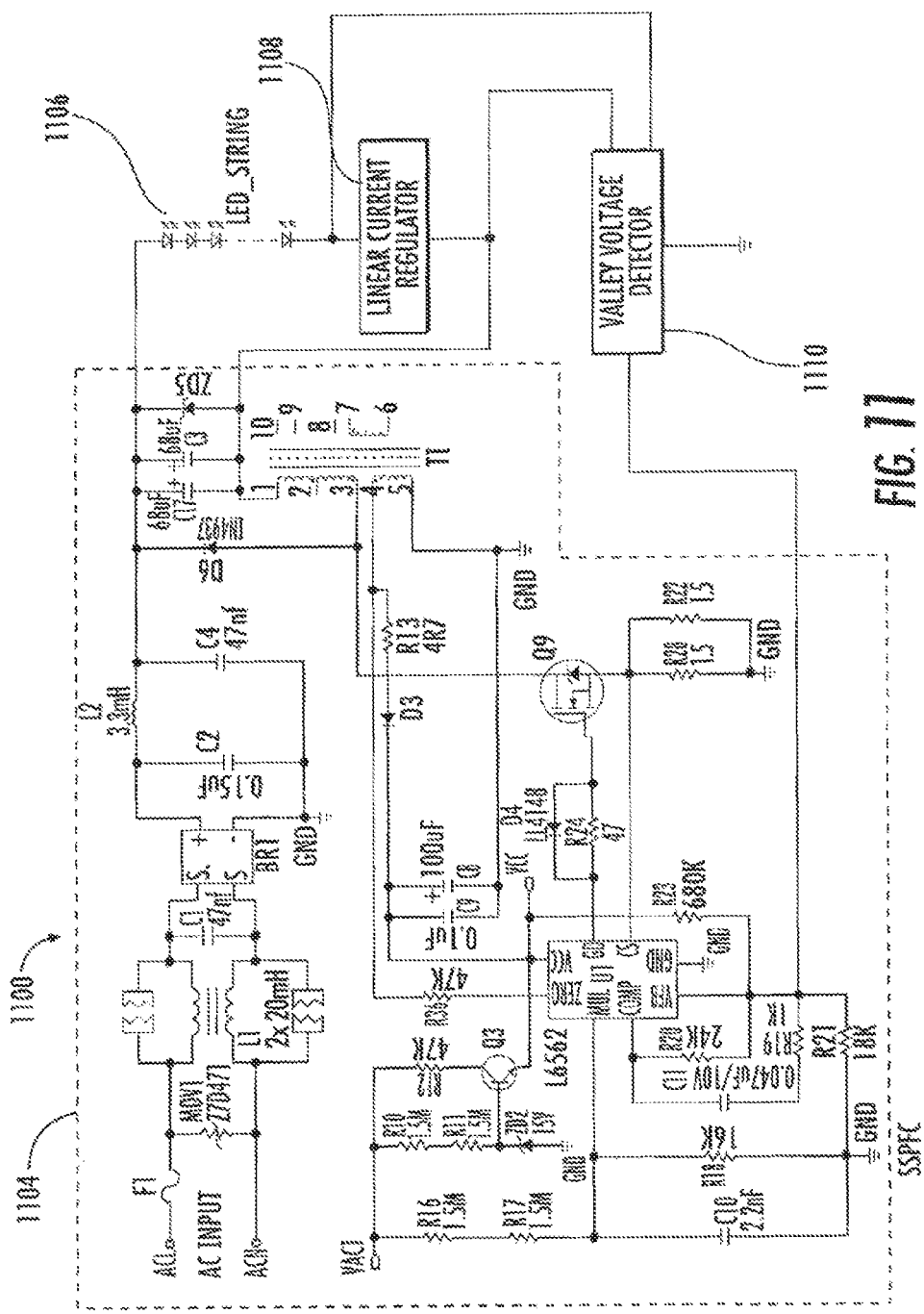
FIG. 11 is an exemplary embodiment of the present invention.

As an example, 13 W flicker-less LED driver 1100 is shown in FIG. 11. The driver consists of 3 parts: SSPFC 1104 (in Buck topology), linear current regulator 1108 and a valley voltage detector 1110. SSPFC 1104 converts AC line voltage into DC voltage and also operates as a Power Factor Corrector. SSPFC 1104 is loaded by LED string 1106 cascaded with linear current regulator 1108. Linear current regulator 1108 consists of a semiconductor switching device and a constant voltage controller. Valley voltage detector 1110 samples the valley voltage of linear current regulator 1108 and then modulates the feedback voltage to SSPFC 1104 to control the output voltage. Consequently, the valley voltage of the linear current regulator is regulated.

TABLE 1

| Parameters of the Flicker-Less LED Driver | |
| --- | --- |
| Input Voltage | 220 V |
| LED string | LG LEMWA51R80JZ LEDs |
| Output power | 11 W |
| Output voltage | 80 V |
| Output Current | 150 mA |

Figure 12A:
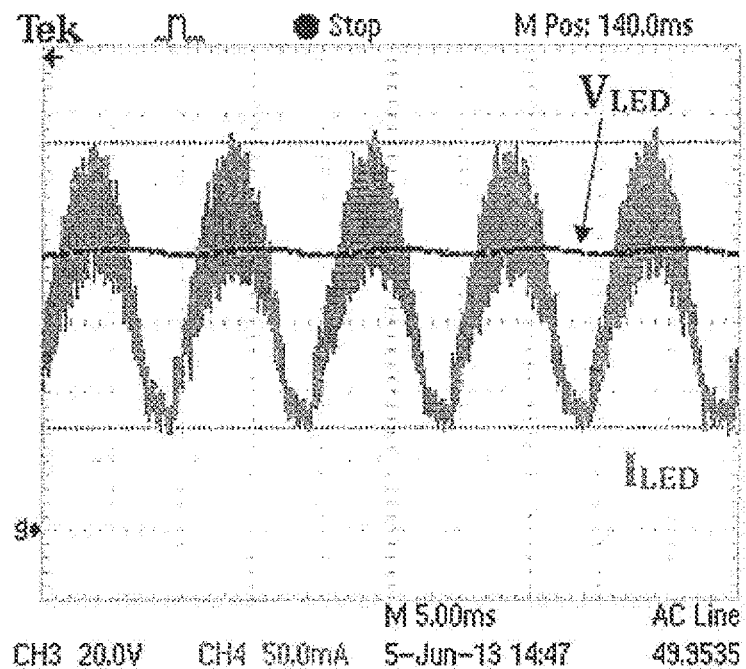
FIG. 12A shows the voltage and current levels for an LED string that is directly driven by the SSPFC without the linear regulation stage.
Figure 12B:
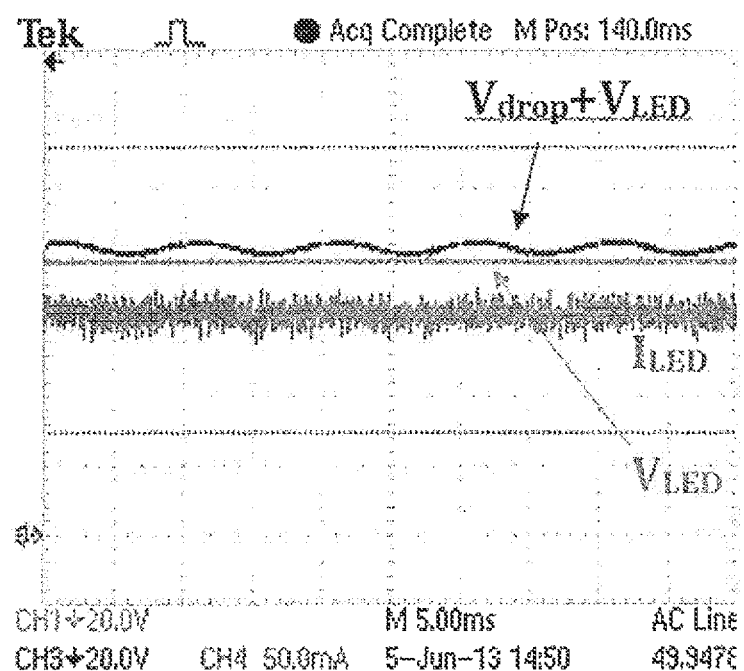
FIG. 12B shows the voltage and current levels for the exemplary embodiment of the present invention.

FIGS. 12A and 12B are practical current and voltage waveforms of an LED string The comparison between FIGS. 12A and 12B shows the effectiveness of the linear current regulation. FIG. 12A shows that without linear current regulation the LED current ripple is around 200 mA peak to peak, which is 133% of the average LED current. FIG. 12B shows that with the linear current regulation, the LED current ripple is reduced to less than 5 mA peak to peak. FIG. 12B also shows that the forward voltage of the LED string is constant because the linear current regulator carries the same voltage ripple as the buck converter output.

Figure 13A:
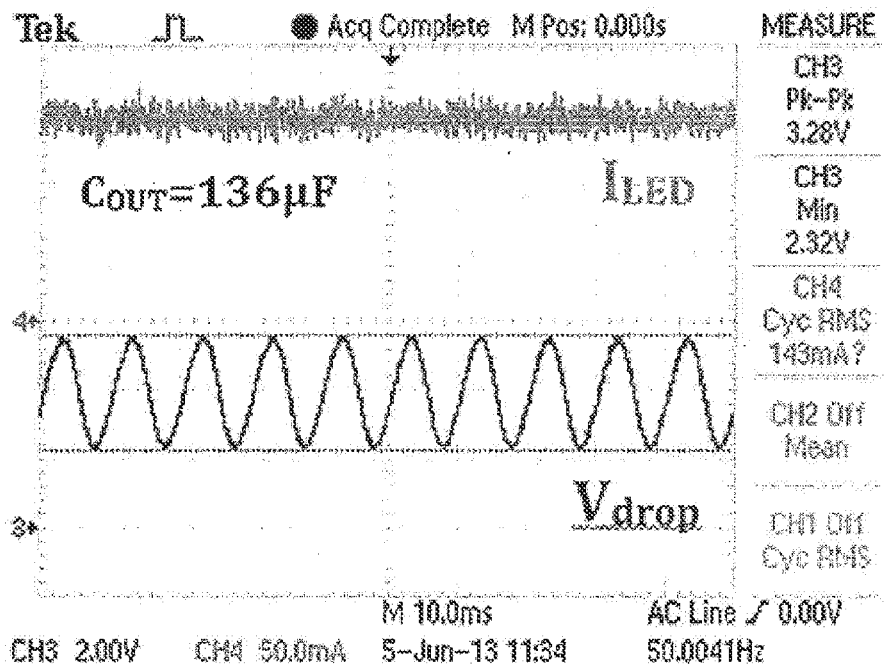
FIGS. 13A and 13B shows the voltage characteristics of an embodiment of the present invention where regulation occurs even when changes occur in the magnitude of the voltage ripple.
Figure 13B:
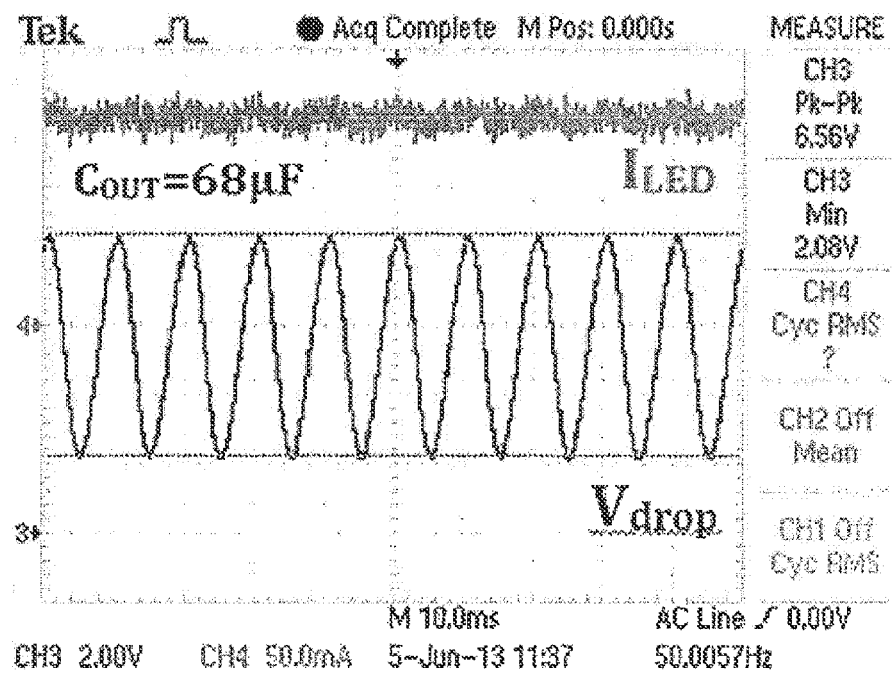

FIGS. 13A and 13B show that valley voltage of the linear regulator is regulated at around 2.5V even though the magnitude of voltage ripple has changed. In this experiment, the output capacitor's value is reduced by half, from 136 μF to 68 μF, consequently the magnitude of output voltage ripple is doubled. FIGS. 13A and 13B show that the linear regulator always operates at threshold voltage, which means it consumes minimum power to guarantee current regulation. Thus, the efficiency and effectiveness of the proposed driving circuit is robust regardless of the changes in $V_{ripple}$.

Table 2 compares the performance of the proposed flickerless LED driver and a conventional single-stage LED driver.

TABLE 2

Comparison of Performance Without/With Linear Regulation

|  | Without Linear Regulation | With Linear Regulation |
|---|---|---|
| $V_{IN}$ (V) | 220.5 | 220.7 |
| $I_{IN}$ (mA) | 56.54 | 60.78 |
| $P_{IN}$ (W) | 12.11 | 12.94 |
| $V_{LED}$ (V) | 79.4 | 79.7 |
| $I_{LED}$ (mA) | 139.2 | 141.4 |
| $P_{LED}$ (W) | 11.06 | 11.27 |
| Efficiency | 91.3% | 87.1% |
| Output Current Ripple | 133% | 1% |
| Power factor | 0.964 | 0.962 |

As shown in FIG. 12A, the threshold voltage of linear current regulator, $V_{supply}$, is around 2.5V and the magnitude of the voltage ripple, $V_{ripple}$, is around 3.2V. According to Table 2, $V_{led\_avg}$=79.7V. Substituting these values into Eq. 9, η is calculated as 0.951. According to Table 2, the measured value of η is:

$$\eta = \frac{87.1\%}{91.3\%} = 0.954$$

The measured value is close to the calculated value 0.951. This result verifies the efficiency expression in Eq. 9 and FIG. 8 as well as the conclusion that the proposed driving circuit can achieve high efficiency for high-voltage LEDs. In this example, driving an 80V LED array the proposed circuit manages to reduce current ripple from 133% to 1% at the expense of 4.2% of efficiency.

The foregoing presents an example of a driving circuit for high voltage LEDs to reduce LED current ripple with high efficiency. By cascading a linear current regulator with the LEDs, the circuit is able to reduce the LED current ripple to less than 1%. A mathematical model of the linear current regulator efficiency is derived and it demonstrates that high efficiency is achievable for high-voltage LEDs applications. Moreover, the method of valley voltage regulation is proved capable to optimize the linear regulation automatically, which makes the driving circuit robust to thermal degradation of LEDs or output electrolytic capacitors. A 13 W/80V flickerless LED driver combines the proposed circuit with a conventional SSPFC driver. The tested results show the flickerless LED driver is able to achieve 99% current ripple reduction and preserves 95% of the efficiency compared to a conventional SSPFC. As demonstrated, the proposed driving circuit provides an efficient and effective solution for high voltage LEDs applications to eliminate the double-line-frequency flicker.

Although specific embodiments have been illustrated and described herein, it will be appreciated by those of ordinary skill in the art that a variety of alternate and/or equivalent implementations may be substituted for the specific embodiments shown and described without departing from the scope of the present invention. The disclosure herein is intended to cover any adaptations or variations of the specific embodiments discussed herein. Therefore, it is intended that this invention be limited only by the claims and the equivalents thereof.

What is claimed is:

1. A lighting array comprising:
a single stage power factor correction driver for converting an AC supply voltage to DC and providing a power correction factor, with an output of the single stage power factor correction driver having an output voltage ripple;
a light emitting diode array;
a linear current regulator connected in series between the single stage power factor correction driver and the light emitting diode array to actively adjust an equivalent impedance of the linear current regulator in correspondence with the output voltage ripple of the single stage power factor correction driver; and
a valley voltage detector coupled between the linear current regulator and the single stage power factor correction driver, the valley voltage detector being configured to:
determine a valley value of the voltage drop across the linear current regulator based on an output of the linear current regulator and an output of the light emitting diode array; and
provide the valley value to the single stage power factor correction driver to modulate a DC output voltage value of the single stage power factor correction driver.

2. The lighting array of claim 1 wherein the linear current regulator is a switching mode current regulator or an active linear current regulator.

3. The lighting array of claim 1 wherein the light emitting diode array is a high voltage array.

4. The lighting array of claim 1 wherein the linear current regulator comprises a semiconductor switching device and a constant voltage controller.

5. The lighting array of claim 1 wherein the single stage power factor correction driver is in a Buck topology.

6. The lighting array of claim 1 wherein a frequency of the output voltage ripple is approximately twice the input line frequency.

7. The lighting array of claim wherein an input of the linear current regulator is connected to the output of the light emitting diode array.

8. A method of reducing output current ripple to a light emitting diode comprising:
converting an AC supply voltage to DC and providing a power correction factor through a single stage power factor correction driver, with an output of the single stage power factor correction driver having an output voltage ripple;
adjusting an equivalent impedance of a linear current regulator in correspondence with the output voltage ripple of the single stage power factor correction driver through the linear current regulator connected in series between the single stage power factor correction driver and a light emitting diode array;

determining a valley value of the voltage drop across the linear current regulator based on an output of the linear current regulator and an output of the light emitting diode array; and feeding the valley value to the single stage power factor correction driver to modulate a direct current output value of the single stage power factor correction driver.

9. The method of claim 8 wherein the linear current regulator is a switching mode current regulator or an active linear current regulator.

10. The method of claim 9 wherein the light emitting diode array is a high voltage array.

11. The method of claim 10 wherein a frequency of the output voltage ripple is approximately twice the input line frequency.

12. The method of claim 11 wherein the linear current regulator comprises a semiconductor switching device and a constant voltage controller.

13. The method of claim 11 wherein an input of the linear current regulator is connected to the output of the light emitting diode array.

14. The method of claim 10 wherein the single stage power factor correction driver is in a Buck topology.

* * * * *